(12) United States Patent
Lee

(10) Patent No.: US 8,934,911 B2
(45) Date of Patent: Jan. 13, 2015

(54) CELLULAR COMMUNICATION SYSTEM COMPRISING MACRO AND MICRO CELLS

(75) Inventor: John C Lee, Horham (GB)

(73) Assignee: British Telecommunications Public Limited Company, London (GB)

( * ) Notice: Subject to any disclaimer, the term of this patent is extended or adjusted under 35 U.S.C. 154(b) by 578 days.

(21) Appl. No.: 13/257,833

(22) PCT Filed: Mar. 26, 2010

(86) PCT No.: PCT/GB2010/000593
§ 371 (c)(1),
(2), (4) Date: Sep. 20, 2011

(87) PCT Pub. No.: WO2010/112824
PCT Pub. Date: Oct. 7, 2010

(65) Prior Publication Data
US 2012/0015655 A1    Jan. 19, 2012

(30) Foreign Application Priority Data

Mar. 30, 2009 (EP) ..................................... 09250949

(51) Int. Cl.
*H04W 4/00* (2009.01)
*H04W 36/00* (2009.01)
(Continued)

(52) U.S. Cl.
CPC ................ *H04W 8/02* (2013.01); *H04W 16/32* (2013.01); *H04W 84/045* (2013.01); *H04W 8/26* (2013.01)
USPC ........ 455/444; 455/433; 455/435.1; 455/436; 455/445; 455/449; 370/331; 370/432; 370/352

(58) Field of Classification Search
CPC ........... H04W 4/02; H04W 8/02; H04W 8/26; H04W 16/32; H04W 84/045; H04W 88/02; H04W 36/04; H04W 4/16; H04W 88/06; H04W 24/00; H04W 60/00; H04W 60/04; H04W 48/18; H04W 36/30; H04W 36/18; H04W 92/02; H04W 84/04
USPC .............................. 455/63.2, 422.1, 433–434, 455/435.1–435.3, 436–449, 456.1–456.3, 455/456.5–456.6, 515, 524–525, 550.1, 455/552.1, 555, 560–561, 41.2, 62.2, 453, 455/458, 466, 500, 517, 524–525, 5; 370/328, 312–313, 331, 334–338, 349, 370/351–357, 389, 392–393, 432, 471, 475, 370/496
See application file for complete search history.

(56) References Cited

U.S. PATENT DOCUMENTS 5,623,535 A * 4/1997 Leung et al. .................. 455/444
5,862,483 A * 1/1999 Fletcher et al. ............ 455/435.2
(Continued)

FOREIGN PATENT DOCUMENTS

EP          2 003 914        12/2008
WO     WO 2004/040938        5/2004
WO     WO 2005/076648        8/2005

OTHER PUBLICATIONS

International Search Report for PCT/GB2010/000593, mailed Sep. 1, 2010.
(Continued)

*Primary Examiner* — Meless Zewdu
(74) *Attorney, Agent, or Firm* — Nixon & Vanderhye P.C.

(57) ABSTRACT

A method of routing call signalling to a destination address from a first cellular mobile communications network comprising a plurality of cells to one of a plurality of smaller cells collectively identified in said first mobile communications network by a single virtual cell identifier. The method involves receiving call signalling for a call in a first routing domain associated with said first mobile communications network, and then determining in said first routing domain from said destination address a forwarding address for said call signalling, wherein said forwarding address comprises said virtual cell identifier, forwarding said call signalling to a network gateway node associated with said virtual cell identifier in said first routing domain, said gateway node being further arranged to participate in a different routing domain by identifying, using said different routing domain, the identity of one of said smaller cells associated with said destination address; and finally, routing the call signalling to said destination address.

12 Claims, 11 Drawing Sheets

(51) Int. Cl.
  *H04W 40/00* (2009.01)
  *H04L 12/66* (2006.01)
  *H04J 3/26* (2006.01)
  *H04W 8/02* (2009.01)
  *H04W 16/32* (2009.01)
  *H04W 84/04* (2009.01)
  *H04W 8/26* (2009.01)

(56) References Cited

U.S. PATENT DOCUMENTS 6,212,389 B1* 4/2001 Fapojuwo ..................... 455/453
2005/0037775 A1* 2/2005 Moeglein et al. .......... 455/456.1
2005/0148368 A1* 7/2005 Scheinert et al. ............. 455/561
2008/0207170 A1* 8/2008 Khetawat et al. ............. 455/411
2009/0219888 A1* 9/2009 Chen et al. .................... 370/331

OTHER PUBLICATIONS

Ho, Lester T. W. and Claussen, Holger, "Effects of User-Deployed, Co-Channel Femtocells on the Call Drop Probability in a Residential Scenario", The 18$^{th}$ Annual IEEE International Symposium on Personal, Indoor and Mobile Radio Communications (PIMRC '07), 2007, 5 pgs.

* cited by examiner

CELLULAR COMMUNICATION SYSTEM COMPRISING MACRO AND MICRO CELLS

This application is the U.S. national phase of International Application No. PCT/GB2010/000593 filed 26 Mar. 2010, which designated the U.S. and claims priority to EP Application No. 09250949.6 filed 30 Mar. 2009, the entire contents of each of which are hereby incorporated by reference.

BACKGROUND

1. Technical Field

The present invention relates to a cellular mobile communications system comprising a macro-cellular communications network and a plurality of smaller, small-scale cells, for example, femtocells or picocells.

2. Related Art

Macro-scale cellular mobile communications networks are well known in the art. Such communications networks rely on coverage from a macro (exterior) cell tower. However, an exterior signal source for the macro-cellular network does not always provide consistent good network coverage within indoor environments or high user density environments. For example, indoor environments such as large buildings, particularly if these are several floors high, and/or high-user density environments indoors or outdoors where there are a large number of users who require network support within a small geographic region may experience unsuitable signal conditions in contrast to the conditions experienced elsewhere in the network which use a similar network infrastructure. Increasingly however, mobile communications users use their mobile regardless of their location being indoors.

As buildings are often constructed from materials which reduce the signals emitted from exterior cell towers such as concrete etc, even where the coverage from the macro cell penetrates the building a consistent signal strength is unlikely to be supported and there may be areas in the building where little or no mobile network coverage is provided.

Picocell and femtocell cellular communications systems attempt to provide small-scale cells which enhance the network coverage of the macro-cellular network in such environments. This enables a mobile communications network subscriber to use their mobile phone as a primary communications device both within the external (macro-scale) communications network as well as within the internal (small-scale) communications network.

Typically a femtocell may provide a cell which extends to cover a small building, for example, a residential building, whereas a picocell may support a cell coverage area of up to around 30,000 sq feet.

There are several deployment issues which various proposed infrastructures for picocell and femtocell communications systems address. For example, one propose infrastructure uses a distributed antenna system to extend the coverage of a single pico/femtocell. However, this may generate interference with the macro-cell and may not establish a dominant signal source within the building. In contrast, whilst deployment of multiple pico/femtocells can ensure good coverage, interference between cells may result in lower data rates being supported.

In solutions where multiple pico/femto cells are supported, network integration and signalling issues must be addressed. For example, a conventional cellular network is designed to support several thousand or tens of thousands of base stations and is unlikely to be scalable to support a femto-cell deployment of millions of access points.

Ho et al in "Effects of User-deployed, co-channel femtocells on the call drop probability in a residential scenario" published in The 18th Annual IEEE International Symposium on Personal, Indoor and Mobile Radio Communications (PIMRC '07), 1-4244-1144-0/07 IEEE, the contents of which are hereby incorporated by reference, addresses briefly the increased network signalling associated with mobility procedures in the core network. For example, they estimate that handovers per hour could be 12,600 for 1 femtocell user per hour per $km^2$ of coverage if a dynamic power configuration approach is adopted and that alternative solutions to lower the number of femtocell configuration events are to block mobility between femtocells and the underlay macrocell or introduce changes to the network architecture such that the impact of signalling to the core network is more localised, for example, by using a flatter, collapsed cellular architecture.

Other issues include the requirement for an operator to be able to locate each base-station and how to regulate this, for example, for E911 requirements the registered location of a base-station is required.

Scheinert et al in WO2004/040938 and US2005/148368 describe an addressing scheme in which all "mini-cells" are assigned a single identifier associated with an access network controller in a main network. However, in this prior art if a mobile device moves outside the range of the minicells of a controller, a number of issues arise.

In US 2005/148368 one issue occurs when an mobile switching centre MSC receives a mobile terminating call (MTC) for a particular mobile station as the MSC sends a paging command to all base station controllers (iBSCs) that control base stations (BSs) associated with the current location area where the mobile station (MS) last performed an update procedure. In another embodiment, each iBSC has its own visitor location registration functionality. This means that the iBSC sends location information only to the BS where a MS is currently located. If a MS changes its iBS cell, the iBSC is notified of its changed location to the new iBS cell. If, however, the MS moves outside the iBSC network coverage area, no update is performed which US'358 addresses by i) the iBSCs VLR polling MSs regularly in order to determine whether they are still in an iBS cell area of that iBSC or not; ii) by maintaining the MS location information in the iBSC's VLR until the next MTC for that MS arrives and using a two-tier paging procedure; or iii) for the iBSC to page first the "home" cell of the mobile as a default.

It is desirable to minimising the amount of signalling that occurs in communication networks. A compromise is usually made between signalling each location change and the signalling that must occur when a MTC is received for a mobile whose change of location has not been updated. Some embodiments of the present invention seek to address the problem of a macro-cellular network managing call routing and/or other signalling events associated with a small-scale cellular network, particularly but not exclusively by providing a unified addressing scheme for both macrocell and smaller cell location registers. The addressing scheme is associated with a signalling/routing scheme which seeks to route MTCs more efficiently to MSs which may roam between both networks by ensuring the location changes are reported in a more effective manner within the area of overlap between smaller cells which overlay one or more macrocells.

3. Brief Summary

Aspects of the invention are as set out below and in the accompanying independent claims and the embodiments of the invention are as set out below and in the accompanying dependent claims. Those of ordinary skill in the art will find apparent that aspects and embodiments of the invention may be suitably combined with each other in any appropriate manner known to one of ordinary skill in the art.

A first aspect of the invention seeks to provide a cellular communications network system comprising a plurality of wireless network communications base stations of a first type; a plurality of wireless network communications base stations of a second type; a plurality of wireless communication cells of a first type which are provided by said base stations of said first type, each cell providing wireless communications cover over a predetermined geographic region to collectively form a macro-cellular communications network; a plurality of wireless communication cells of a second type which are provided by said base stations of said second type, wherein a plurality of said second type of cells collectively provides wireless communications cover within a region smaller than the predetermined geographic region of said first type of wireless communication cells; a gateway node providing an interface between a routing domain associated with cells of said first type and a routing domain associated with cells of said second type; a routing node for routing communications and signalling in said macro-cellular communications network; and a first location register for registering the location of a plurality of mobile communications devices in one or more cells of said first type in said macro-cellular communications network; wherein the first location register records the location of at least one of said mobile communications device as a virtual location if the said mobile communication device reports its location to a routing node for said macro-cellular communications network as within one of a predetermined plurality of wireless communication cells of said second type.

The first location register may record the location of the said mobile communications device as said virtual location instead of recording the location of the device in a cell of said first type.

Alternatively, the first location register may record the location of the said mobile communications device as said virtual location in addition to recording the location of the device in a cell of said first type.

The location of the said mobile communications device is provided as a cell identifier in said location registry.

The identifier for the cell of the second type may be provided to said first location register in addition to the virtual cell identifier by said mobile communications device.

The virtual cell identifier for the cell of the second type may be stored on said first location register instead of the identifier for the cell of the first type.

Another aspect of the invention seeks to provide a method of routing call signalling to a destination address, said method routing the call signalling from a first cellular mobile communications network comprising a plurality of cells to one of a plurality of smaller cells collectively identified in said first mobile communications network by a single virtual cell identifier, the method comprising: receiving call signalling for a call in a first routing domain associated with said first mobile communications network; determining in said first routing domain from said destination address a forwarding address for said call signalling, wherein said forwarding address comprises said virtual cell identifier; forwarding said call signalling to a network gateway node associated with said virtual cell identifier in said first routing domain, said gateway node being further arranged to participate in a different routing domain by identifying, using said different routing domain, the identity of one of said smaller cells associated with said destination address; and routing the call signalling to said destination address.

The first routing domain may be associated with a first location register for identifying a cell location of a called mobile communications device, wherein the location of said mobile communications device is identified as being in said virtual cell in said first cellular mobile communications device.

The different routing domain may be associated with another location register, wherein said mobile communications device is identified as being in one of said smaller cells in said other location register.

In said first location register the virtual cell identifier and the cell identifier of said smaller cell in which said mobile communications device is located may be stored and in said first routing domain only said virtual cell identifier may be used for routing purposes. The method aspect may further comprise modifying said call signalling in said macro-cellular network to provide an indication of the identity of said smaller destination cell in which said mobile communications device is located to said gateway node, whereby said gateway node forwards said call signalling to the base station associated with the smaller destination cell.

The plurality of smaller cells collectively identified in said first mobile communications network by a single virtual cell identifier may form a second cellular communications network.

The gateway node may comprise a wireless access point for one of said plurality of smaller cells collectively identified by said virtual cell identifier.

One or more of said smaller cells may comprise a femtocell. One of said smaller cells may comprise a picocell.

Another aspect of the invention relates to a method of registering a mobile communications device in a communications system comprising a first cellular communications network and at least one second cellular mobile communications network comprising a plurality of cells of smaller size than the cells in said first cellular communications network, wherein said mobile communications device is capable of receiving calls sent using the first communications network using the network infrastructure of the second communications network, the method comprising:

registering a virtual cell location of a mobile communications device in a first location register for said communications system, said virtual cell location collectively representing the cell identity of the plurality of cells which collectively form said second cellular network; and registering a cell location for the location of the mobile device in said second cellular network in a second location register accessible within said second cellular network, wherein both location register entries are required to route calls originating external to said second cellular network to said destination location in said second cellular network by firstly determining the virtual cell location of the called mobile communications device in the first location register and secondly determining the cell location of said called mobile communications device in said second cellular network in a second location register.

One or more cells in said second location register may comprise a femtocell.

One or more cells in said second location register may comprise a picocell.

Another aspect of the invention relates to a communications system comprising a macro-cellular mobile communications network and a plurality of smaller, cells collectively identified in said macro-cellular network by implementing a registration scheme according a method of registering aspect of the invention.

Another aspect of the invention seeks to provide a communications system aspect in which the macro-cellular mobile communications network comprises a radio access network comprises one of the following types of mobile communications networks:

a Global System for Mobile (GSM) network; a Worldwide Interoperability for Microwave Access (Wi-MAX) network; a General Packet Radio Service (GPRS) network; a Generation Partnership Project (3GPP) network; or any other suitable $4^{th}$ or higher generation radio access network.

GSM is the standard for digital cellular communications that has been widely adopted across Europe and other territories. The GSM standard operates in the 900 MHz and 1800 MHz bands and provides a host of services using a sophisticated signalling system.

WI-MAX is a standards based technology known as IEEE 802.16 which is able to provide fixed and mobile broadband access at large coverage distances in Line of Sight and Non Line of Sight conditions. The technology provides high-throughput broadband connections, enabling the delivery of last mile wireless broadband access as an alternative to cable and DSL.

GPRS is a standardised dedicated data service based on a separate packet data network which allows up to 8 GSM channels to be concatenated together giving a possible bit rate of over 70 kbits/s. GPRS basically provides a connectionless service for GSM. It uses IP as the backbone for transmission introducing a new network to support the connectionless nature but shares the base station and radio resource.

A 3GPP network is a network for which the 3GPP has produced a globally applicable technical specifications and technical report. Typically, a 3GPP network comprises a 3rd Generation mobile communications system based on an evolved GSM core network and a supported radio access technology such as, for example, Universal Terrestrial Radio Access (UTRA) in a Frequency Division Duplex (FDD) and/or Time Division Duplex (TDD) mode. In addition, a 3GPP network is specified to include the maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)).

Another aspect of the invention seeks to provide a base station for use as a gateway node in a communications system aspect, the base station being associated in the macro-cellular communications network with said virtual cell identifier and arranged to resolve the signalling addressed to said virtual cell identifier to an identifier for a cell in said second communications network associated in said second location register with the cell location of the destination device for the incoming call.

Another aspect of the invention seeks to provide a method of routing signalling for a call in a cellular communications network system, the system comprising: a first wireless communications network having: a mobile switching centre; a plurality of macro-cell base stations, each said macro-cell base station being associated with a macrocell of network cover; and at least one macrocell location register, wherein the first wireless communications network shares at least some of its area of network coverage with at least one second wireless communications network, wherein said a said at least one second wireless communications network comprises a gateway node for a plurality of small cell base stations providing smaller cellular areas of network coverage than said macro-cells, each small cell base station being arranged to report a change of small cell location address of a mobile device to said gateway node; wherein, said gateway node is configured to forward a received change of small cell location from a said small cell base station to the macrocell location register together with a virtual macrocell identifier, the virtual macrocell identifier identifying a gateway node for a plurality of associated small cells; the method comprising: said mobile switching centre receiving said mobile terminating call for a mobile device; said macrocell location register indicating to the mobile switching centre that the mobile is located in said virtual location cell; forwarding the call signalling to the gateway node associated with said virtual location cell, said signalling including the small cell location of the mobile device; the gateway node processing the received call signalling information to extract the small cell location; and forwarding the call signalling to the base station associated with the indicated small cell location.

Another aspect of the invention seeks to provide a cellular communications network system, the system comprising: a first wireless communications network having:

a mobile switching centre; a plurality of macro-cell base stations, each said macro-cell base station being associated with a macrocell of network cover; and at least one macrocell location register, wherein the first wireless communications network shares at least some of its area of network coverage with at least one second wireless communications network, wherein said a said at least one second wireless communications network comprises: a gateway node for a plurality of small cell base stations providing smaller cellular areas of network coverage than said macro-cells, each small cell base station being arranged to report a change of small cell location address of a mobile device to said gateway node; wherein, said gateway node is configured to forward a received change of small cell location from a said small cell base station to the macrocell location register together with a virtual macrocell identifier, the virtual macrocell identifier identifying the gateway node as being the gateway for said plurality of associated small cells; and said macrocellular location register stores a location address for a mobile device as comprising said virtual macrocell identifier and said small cell location identifier.

In this way, the macrocell location register can store a full location address comprising a virtual cell location which indicates that a call should be forwarded to a gateway node which provides access to a plurality of small cells. To reduce the signalling the gateway node provides, the small cell address location can also be stored in the macrocell location register, but this part of the location address is not used for routing in the macrocell network. It is only when a gateway node receives signalling associated with a virtual cell that the gateway node processes the provided location address to extract the location of the small cell. This means that instead of having to poll a plurality of different cells, the gateway node will simply forward the signalling to the base station indicated in the macrocell location register. This implementation assumes that the gateway node will also have forwarded changes to the small cell location to the macrocell location register as well as to its own location register. If a mobile device (or equivalently station) then moves outside the range of a particular gateway, the macrocell entry will be updated to replace the virtual cell with the new macrocell identifier (which may be a virtual or "normal" macrocell identifier). This means that when a mobile moves outside the virtual cell coverage area, the call signalling (and so the call itself) will not be forwarded to the gateway associated with that particular virtual cell, triggering a needless poll of base stations within the area of that virtual cell identifier. In one embodiment, the gateway node may also update a location register for the small area cells so that if a change occurs which for some reason has not yet propagated to the macro-cell network, this can be corrected at the gateway node.

If a small cell location register may be associated with the gateway node and used to store the location of a mobile device in association with the small cell base station within whose area of network coverage the mobile device is located, the gateway node is required to ensure both the macro and small cell location registers are updated with any location changes.

BRIEF DESCRIPTION OF THE DRAWINGS

Embodiments of the invention will now be described with reference to the accompanying drawings, which are by way of example only, and in which.

DETAILED DESCRIPTION OF EXEMPLARY EMBODIMENTS

The preferred embodiments of the invention will now be described with reference to the accompanying drawings, including the best mode of the invention as currently contemplated by the inventor.

Figure 1:
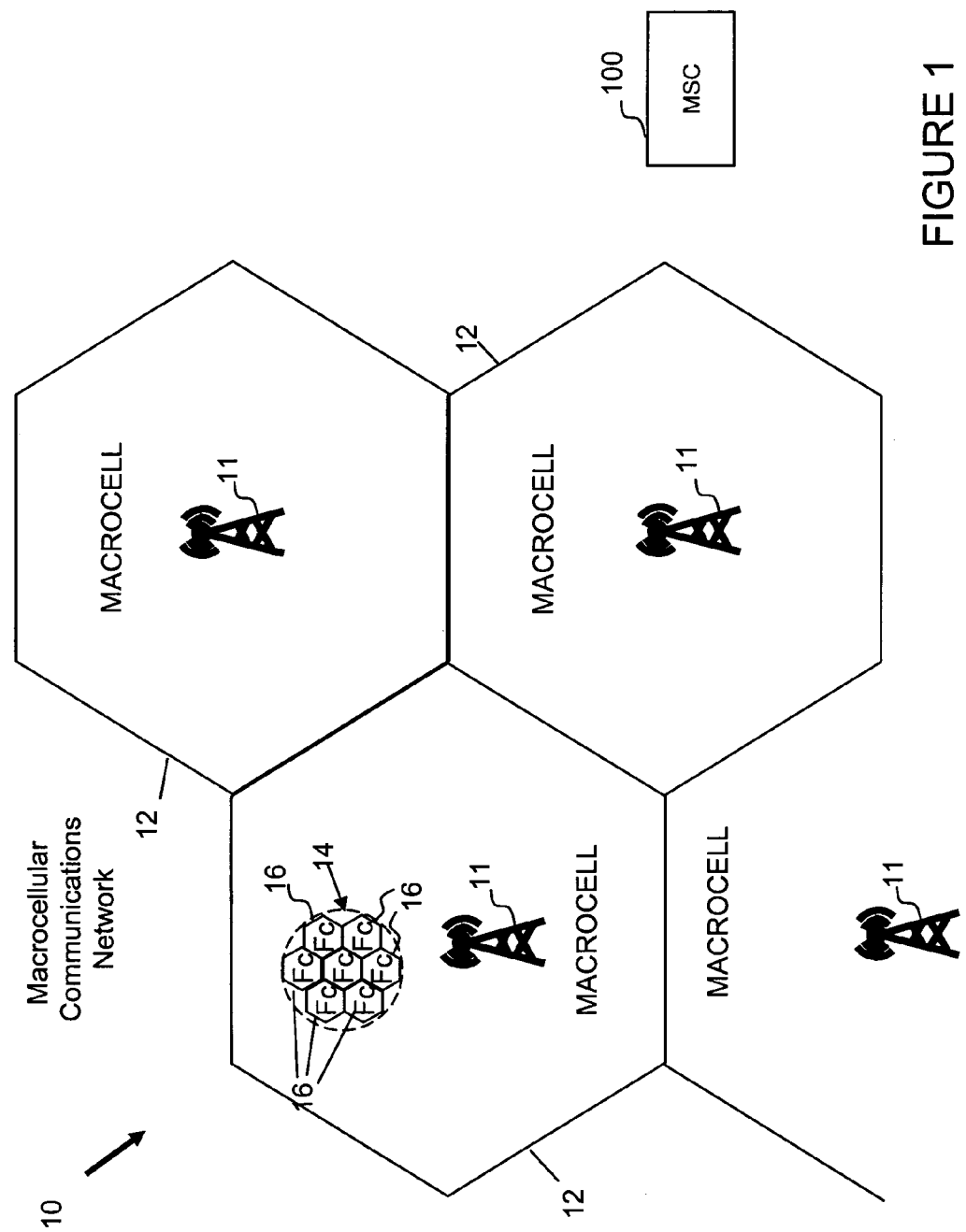
FIG. 1 shows schematically a cellular communications system.

FIG. 1 of the accompanying drawings shows schematically a cellular mobile communications system 10 in which a macro-cellular network is provided by base stations 11, each of which provide mobile communications coverage within a macro-scale cell 12, three such cells only being shown in their entirety for clarity in FIG. 1.

Also shown in FIG. 1 is a small-scale cellular communications network 14 which comprises a plurality of small-scale cells 16. Mobile communications coverage within cells 16 is provided by a different type of base station which limits coverage to a smaller geographic region than the base stations of the first type which provide the macro-scale cells 12.

Macro-scale cellular network comprises any suitable cellular communications system, for example, a GSM cellular network or alternatively a Code Division Multiple Access (CDMA) 2000, General Packet Relay Service (GPRS), Time-Division Synchronous CDMA (TD-SCDMA), and WiMAX, or any other suitable network technology.

Although for clarity in FIG. 1 only one small-scale network 14 is shown within only one macro-cell 12 of the mobile communications system 10, those of ordinary skill in the art will find it apparent that FIG. 1 is not to scale and that many more cells of both types and small-scale networks 14 may be provided in actual implementations of a mobile communication system 10.

As mentioned already, in FIG. 1, small-scale communications network 14 comprises a plurality of small-scale cells 16. An example of a suitably sized small-scale cell include a cell known in the art as a femtocell, and another example of a suitably sized small-scale cell is known in the art as a pico-cell. Thus a small-scale cell for the purposes of the invention is likely to range from tens of square feet up to around 30,000 sq feet, although the term small-scale cell is defined herein to comprise a cell which provides a sufficiently smaller network coverage region than a large-scale (macro-scale) cell for several small-scale cells to potentially lie within the area of network coverage of a single cell macro-scale cellular mobile communications network. Those of ordinary skill in the art will none the less find it apparent that whilst several small-scale cells may provide within the area of network coverage that a single macro-scale cell is capable of covering, in some areas it is possible for the small-scale cells forming a small-scale network to span the boundary between two or more macro-scale cells.

Figure 2A:
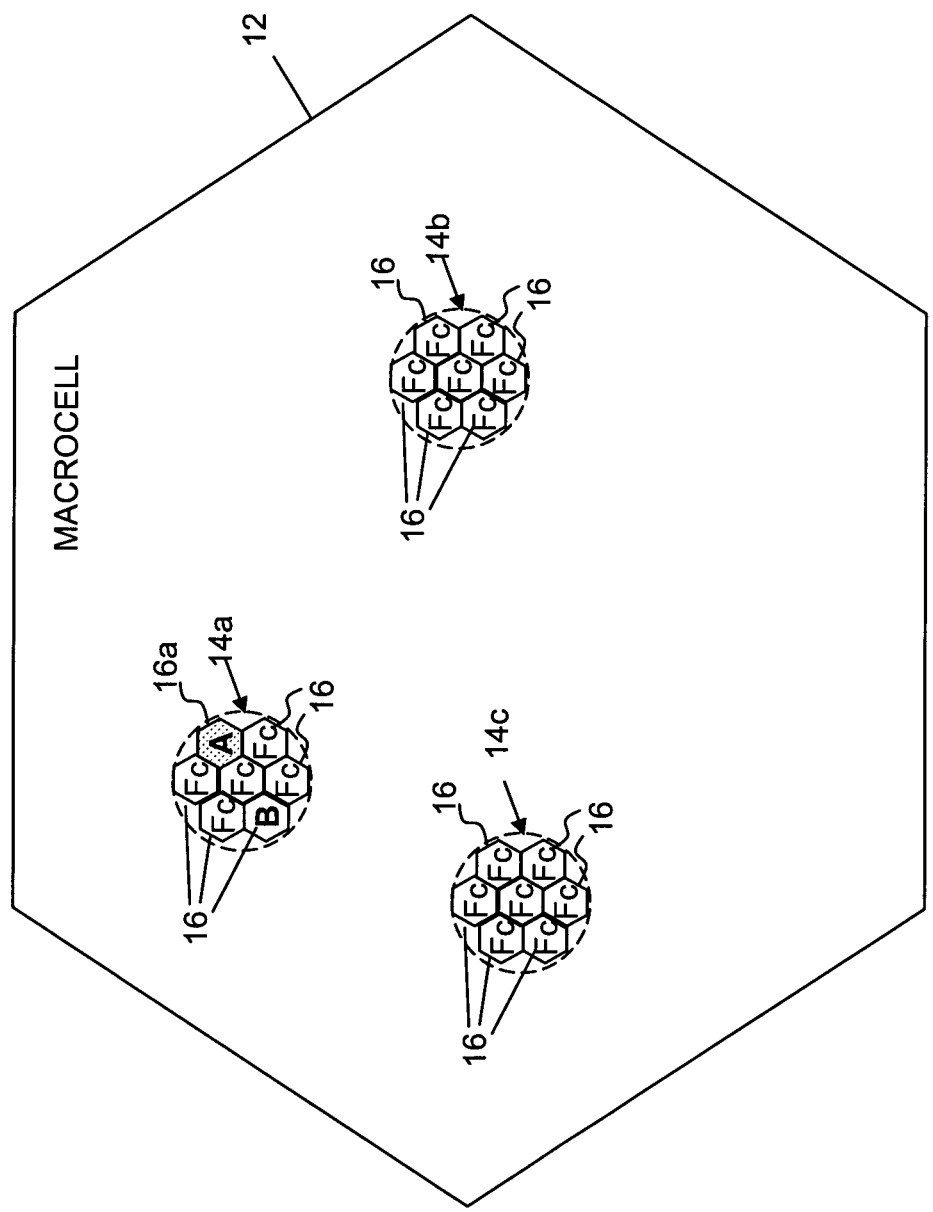
FIG. 2A shows schematically a macro-cellular network cell within which a plurality of small-scale cellular communications networks are provided.

FIG. 2A of the accompanying drawings shows schematically a plurality of small-scale cellular communications networks 14a, 14b, 14c located within a single macro-cell 12 of the macro cellular communications network. Each of the small-scale communications networks 14a . . . 14c shown in FIG. 2A comprises is a plurality of small-scale cells 16. Although each of the small-scale communications networks 14a . . . 14c shown in FIG. 2A comprises the same number of small-scale cells, those of ordinary skill in the art will find it apparent that in implementations of the invention, the number of small-scale cells which are capable of forming a small-scale cellular communications network may be different. The signal coverage within the small-scale cellular communications network cells is provided by base stations (not shown in FIGS. 2A to 2C). The communications network service is provided by macro-cell 12 except in those regions of over-lap with the small-scale cells 16 forming the small-scale cellular communications networks 14a . . . 14c.

Figure 2B:
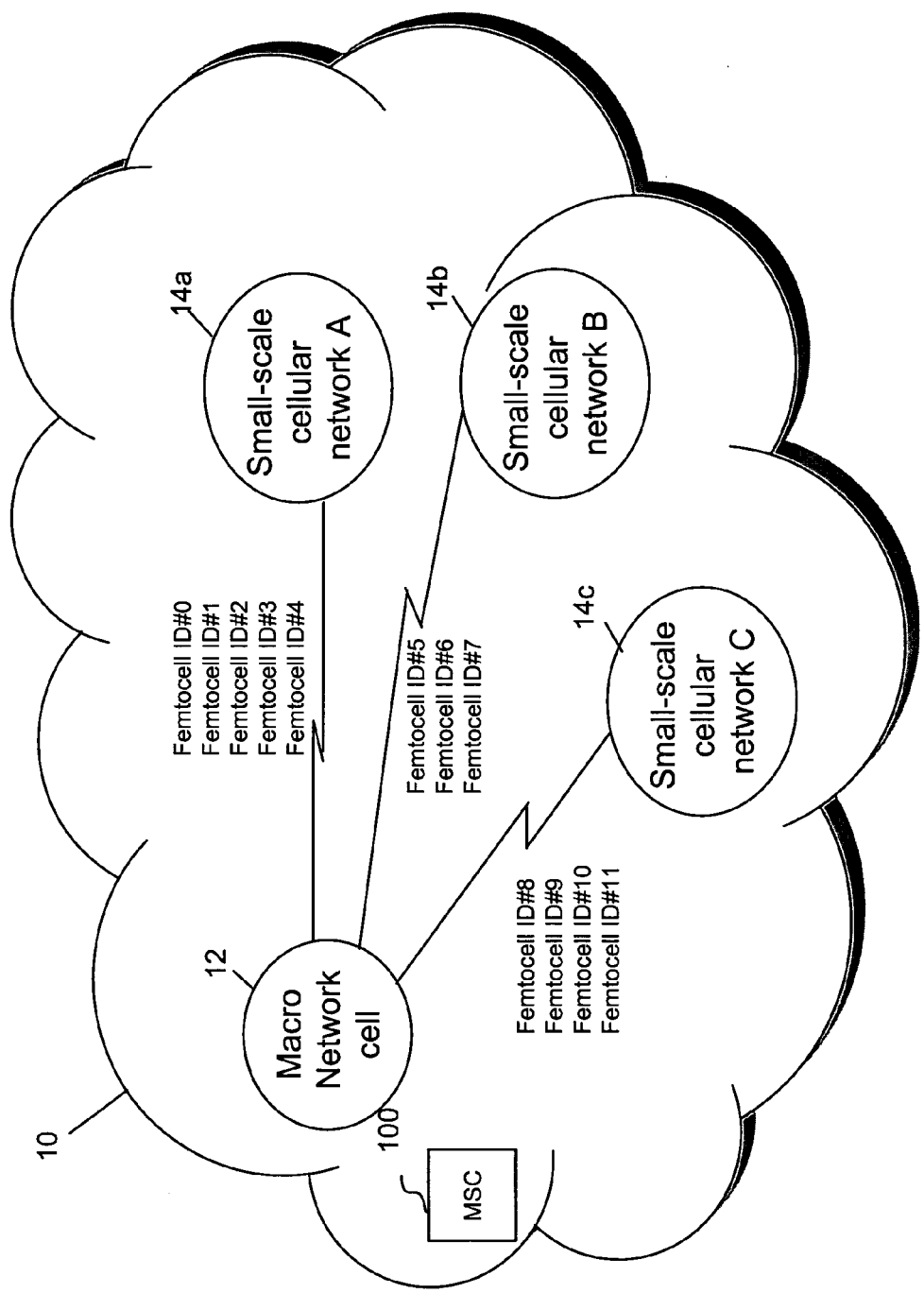
FIG. 2B shows schematically conventional signalling requirements for communications between the macro-cellular network and the small-scale cellular communications networks shown in FIG. 2A.
Figure 2C:
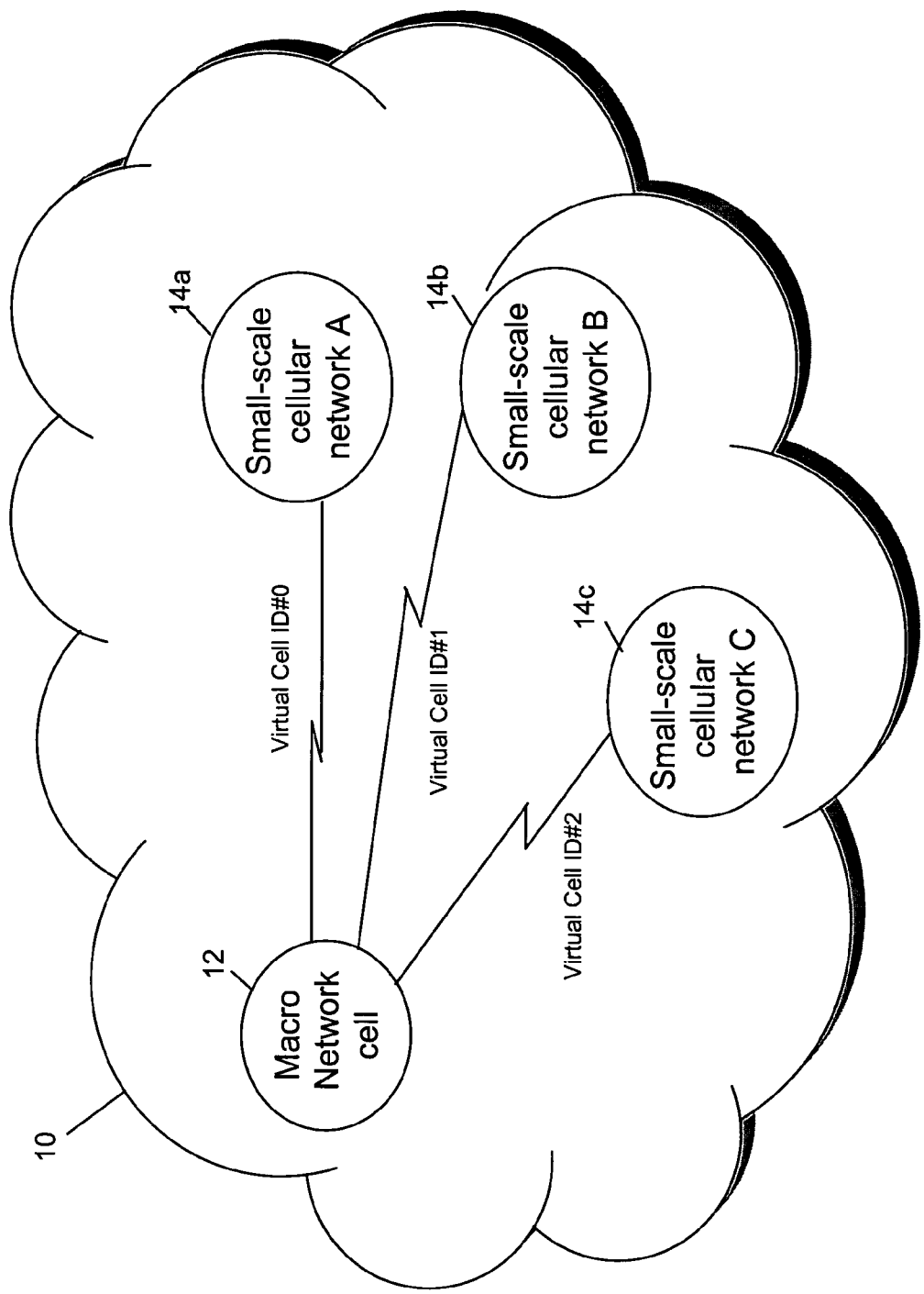
FIG. 2C shows schematically signalling requirements for communications between a macro-cellular network and the small-scale cellular communications networks shown in FIG. 2A according to an embodiment of the invention.

FIGS. 2B and 2C of the accompanying invention show schematically signalling which is sent from the macro-cellular network to the small-scale cellular networks of FIG. 2A.

FIG. 2B shows schematically the signalling requirements which require each cell 16 in a small-scale network 14 to be uniquely identified within the macro-scale cellular network 10 for signalling purposes such as handovers and call routing.

In FIG. 2B, the area of network coverage provided by macrocell 12 includes three small-scale communications networks 14a, 14b, 14c. Network coverage for communications supported by the macrocell 12 is provided within the small-scale communications networks 14a,b,c by a plurality of small-scale cells. Small-scale communications network 14a comprises five femto-cells, each of which has a unique identifier code shown schematically as Femtocell ID #0, Femtocell ID #1, Femtocell ID #2, Femtocell ID #3, and Femtocell ID #4. Small-scale communications network 14b comprises three femto-cells which are identified for signalling purposes as Femtocell ID #5, Femtocell ID #6, Femtocell ID #7 and small-scale communications network 14c comprises four femto-cells identified as Femtocell ID #8, Femtocell ID #9, Femtocell ID #10, Femtocell ID #11.

In practice as those of ordinary skill in the art will find apparent, it is feasible that in future as many as several million femtocells may be provided within the coverage of a macro-cellular network 10 requiring signalling from each macrocell 12 to as many as several thousand femtocells to be supported. The level of signalling which would need to support potentially millions of femtocells within the macrocellular network result in a level of network overhead within the macrocellular network which could severely congest the macrocellular network.

In order to address such signalling issues and provide a more scalable solution to the problem of signalling between macro-scale and small-scale cellular mobile communications networks, a signalling scheme is proposed such as that shown in FIG. 2C according to an embodiment of the invention.

FIG. 2C shows a small-scale cellular network according to an embodiment of the invention, in which for routing purposes each cluster of small-scale cells 16 is treated as forming a small-scale cellular network 14a, 14b, 14c and each small-scale cellular network 14a . . . 14c is separately identifiable by a virtual cell identifier within the macro-cellular communications network for routing purposes.

For example, each small-scale cell 16 within small-scale cellular network 14a is identified by a Virtual Cell ID #0, and each small-scale cell 16 within small-scale cellular network 14b is identified via a different virtual cell identifier Virtual Cell ID #1, and each small-scale cell 16 within small-scale cellular network 14c is identified via Virtual Cell ID #2. Thus, in the embodiment of the invention shown in FIG. 2C, the macro-cellular mobile communications network 10 routes an external call to a device located in any one of small-scale cells 16 to the same virtual cell identifier VirtualCellID #0.

In embodiments of the invention where the macro-cellular network performs routing and signalling of communications using location registers for mobile communications devices, routing/signalling is implemented by replacing the identifier for macro-cell 16 in the location register with that of the relevant virtual cell identifier, e.g. for a device located in the small-scale cell 16a with the dotted fill and labelled "A" in FIG. 2A, the location table entry in the macro-cellular network would indicate the device location as VirtualCellID #0.

Figure 3:
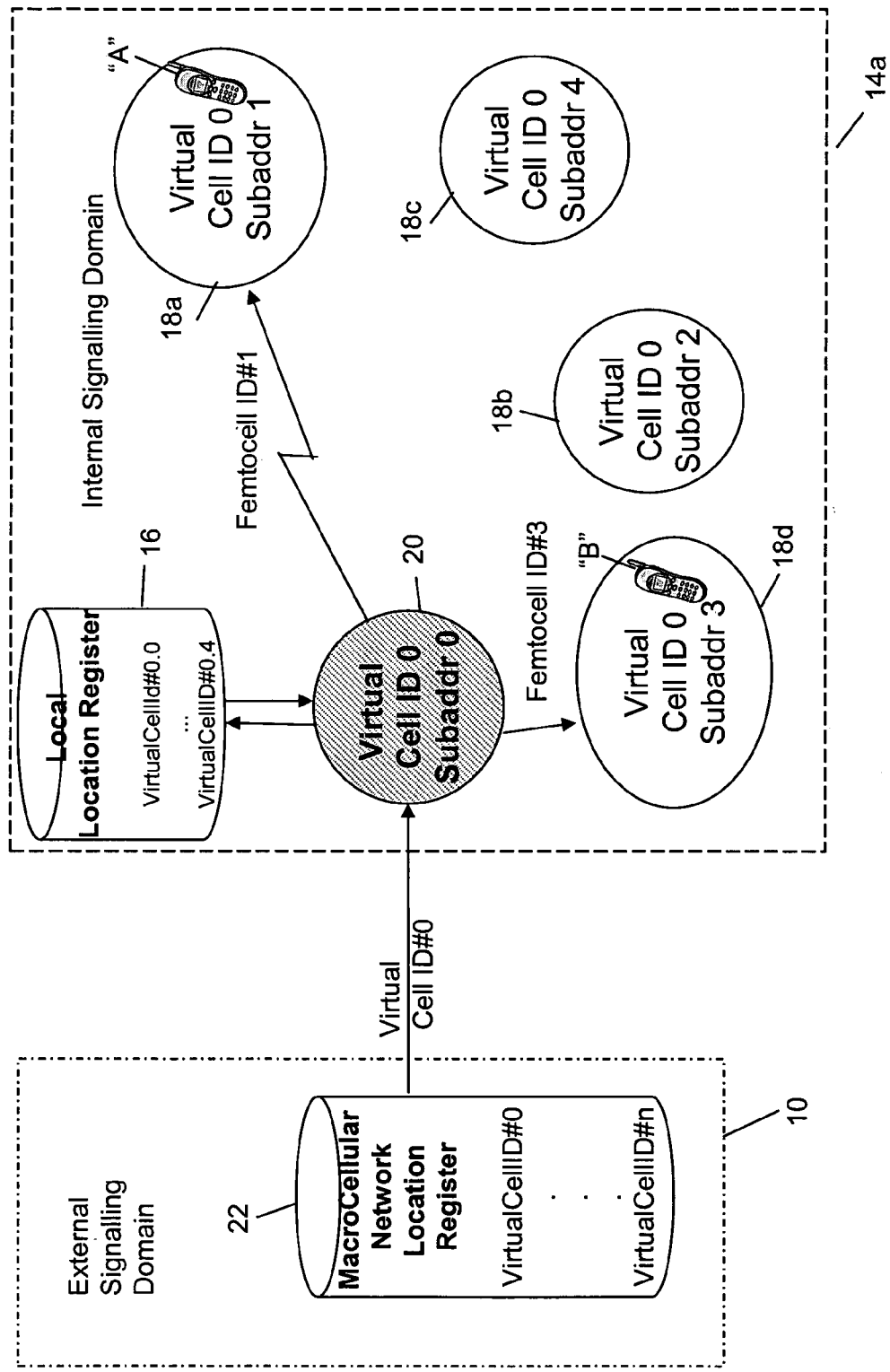
FIG. 3 shows schematically the routing domains of a communications system according an embodiment of the invention.

FIG. 3 shows in more detail a communications system according to an embodiment of the invention which comprises a macro-cellular communications system 10 within with a plurality of small-scale communications networks are provided, only one of which is shown for simplicity, small-scale communications network 14a.

In FIG. 3, a cell cluster comprising a plurality of small-scale cells, for example, femtocells 18a,18b,18c, and 18d and 20 creates a small-scale communications network 14a. Examples of small-scale communications network 14 include any communications network comprising a cluster of femto-cells and/or picocells each of which supports the communications network protocol of macro-cellular communications network 10 but over a much smaller cell-domain size. For example, small-scale communications network 14a may be provided an office environment in which each office contains a base-station supporting a femtocell, for example, a lower power GSM femto-cell. Each base station supports a single cell in this embodiment of the invention.

Not shown in FIG. 3, although represented by the small-scale cell that it may support is a gateway node for communications addressed to the virtual cell identifier for small-scale communications network 14a. Also shown as forming part of communications network 14a is a local location register 16 which may comprise part of the gateway node or be supported by another computing platform with which the gateway node is configured to communicate.

In order to reduce the configuration information which needs to be shared with the external macro-cellular communications network 10, a configuration parameter is provided for each base-station which provides a small-scale cell to form small-scale communications network 14. This configuration parameter enables each small-scale cell 18a,18b,18c, 18d, 20 to form a predetermined cluster of cells which are collectively associated with the same virtual cell identifier within the macro-communications network 10.

In one embodiment, a hierarchical cell-identification scheme is provided so that externally to the small-scale networks 14a,b,c in macro-cellular communications network 10, only virtual cell identifiers are provided, yet within each small scale network signalling is resolved to each of the individual small-scale cells 18a,18b,18c,18d, 20.

In a signalling scheme according to an embodiment of the invention, a base station which supports one of the individual femto-cells 18a, . . . , 18d, 20 also functions as a router. In the embodiment of the invention shown in FIG. 2B, the base station for the small-scale cell 20 (shown with a hatched background in FIG. 3) is configured to act as a gateway device for the small-scale communications network. Thus the base-station for femto-cell 20 receives communications from the external macro-cellular network for all of the small-scale cells whose cell identities are externally represented by the same virtual cell identifier VirtualCellID #0.

The base station for small-scale cell 20 then forwards received communications to the other small-scale cells on the basis of a local signalling scheme using a local location register 16.

Accordingly, in this embodiment of the invention, despite small-scale cellular communications networks 14a,b,c each comprising a plurality of small-scale cells 16, the macro mobile network operator base station transceiver/base station controller for the macro-cell 12 holds only a virtual cell identifier for each network in its visitor location register for those mobile communications devices which are within the domain of each small-scale network.

Accordingly, in an exemplary embodiment, a mobile communications device "A" which is in a small-scale cell, for example a femtocell, identifiable within the small-scale communications network 14a by the FemtoCellID SubAddress #1 (for example, say, the small-scale cell labelled "A" in FIG. 2A) is associated in the macro-cellular network 10 with a virtual cell identifier VirtualCellID #0, as will mobile communications device "B" despite the fact that "B" is located in the femtocell with the FemtoCellID SubAddress #3 in small-scale communications network 14a (for example, the small-scale cell labelled "B" in FIG. 2A). Here VirtualCellID #0 takes the form of a cell identifier conforming to the respective communications protocol of the macro-cellular network 12, for example, a GSM cell identifier or a 3G cell identifier. Calls to both mobile communications devices "A" and "B" are thus routed to the gateway base station for small-scale cell 20 in the macrocellular network using the same virtual cell identifier entry in the macrocellular location register 22 and are resolved afterwards to their differing small-scale cells using the local location register 16 using the subaddress for each small-scale cell.

In the above embodiment, when a macro-cellular originating (external) call is received by the gateway base-station providing access to the small-scale network 14a, the gateway base-station processes the received call to determine its subaddress. This requires each base-station participating in a signalling scheme for a small scale network 14 according to an embodiment of the invention to be configured with an appropriate sub-address for these internal routing purposes and for the mapping between a mobile handset identifier and its current base-station sub-addresses to be maintained in location register 16.

In the above embodiment, when the gateway base-station receives an incoming communications from a source external to the small-scale communications network 14a, the base-station performs a local address query operation, for example, a look-up operation on a local location register 16 which is maintained for the purpose of routing communications between small-scale cells 18a . . . 18d, 20 within small-scale network 14a. The address query operation returns a local cell identifier, SubAddressCellID #0 . . . #4 depending on the small-scale -cell that the destination mobile device has registered itself in.

Accordingly, whilst a mobile communications device needs to report its presence in macro-cell 12 for registration in the appropriate home/visitor location register which is maintained for routing purposes in the macro-scale network it must also register its location locally in the local presence register 16 which is maintained for each local small-scale network according to the invention.

Whilst conventionally, if a mobile communications device moves to a location in which the network coverage is dominated by signals provided by a femto-cell base station, then the mobile communications device would conventionally register its presence in the respective femto-cell using the identifier for that femto-cell in a visitor location directory of the macro-cellular network. However, as the size of a femto-cell is quite small, registering each femto-cell location is likely to generate a high-level of signalling as roaming between femtocells will occur more frequently.

A signalling scheme according to an embodiment of the invention such as that provided to support the network infrastructure shown in FIG. 3 reduces the amount of signalling overhead in the macro-cellular network. It also reduce the number of entries that the macro-cellular network must support in its location registers.

In one exemplary embodiment of the invention, where the small-scale cells comprise femto-cells and/or pico-cells, small-scale cells 18a, . . . , 18d, 20 are assigned the same VirtualCellID #0, suffixed to this is a small-scale cell specific sub-address, and when a mobile communications device registers its presence the virtual address and the sub-address are stored in the location register 22 of the macro-cellular network. For example, the registry entry in location register 22 for mobile communications device "A" could read VirtualCellID #0.subaddressID #1, whereas the registry entry in location register 22 for mobile communications device "B" could read VirtualCellID #0.subaddressID #3. As another example, if the small-scale cell where device A is located comprises a femto-cell, then the location register entry for device A associates an identifier for that device (or alternatively, an identifier for the subscriber using device A) with VirtualCellID #0.FemtoCellID #1 etc.

In this embodiment, however, whilst the full address information is stored in the location register of macrocellular base stations 22 when a mobile communications device "A" or "B" first registers its location within the small-scale network 14a, updates to the macro-cellular location register do not occur unless the mobile communications device changes its location at the macro-cellular level or if its VirtualCellID entry changes as it roams to another small-scale network, say 14b, or 14c within the same macro-cell.

In this embodiment, the macro-cellular base stations are configured to ignore the femto-cell subaddress information for routing purposes and will forward all received the received information to the gateway base-station. The gateway base-station reads the sub-address information which was appended to the virtual cell id (and which is provided in the call signalling). This information then enables the base station to forward the received call signalling directly to the sub-address indicated. If the mobile communications device has changed its location, the receiving base-station will report this back to the gateway base-station which then performs a look-up operation in a local small-scale cell location register if one is provided (as described herein above) to determine the current small-scale cell within which the mobile communications device is located. This scheme reduces the number of location register queries a gateway base station needs to perform as look-up operations are only performed on the local location register if the macro-cellular location register entry is out of date or otherwise in correct.

Alternatively, any other suitable technique known in the art may be used by the base station to determine the current location of the communications device, for example, a polling operation may be performed by communicating a location query which is sent to all the other base stations forming the small scale communications network 14 until a positive response is received. The polling operation may be performed by broadcasting or sequentially communicating with the other base stations, or the location may be determined by any other suitable means known in the art. For example, if a mobile communications device "A" is associated with the base station for the femtocell with SubAddressCellID #1, then the base-station can query either in turn or by broadcasting a query the other base-stations in the small-scale site to determine the current location of mobile communications device "A". Once this has been determined, it can route the communications call to device "A" via that base-station.

Whilst the embodiment described herein generally refer to small-scale cells as femto-cells, those of ordinary skill in the art will find apparent that references to femto-cells may be replaced and/or supplemented by references to pico-cells. The references to macro-cells and a macro-cellular network herein may similarly be replaced with references to micro-cells and a micro-cellular network.

An embodiment of the invention thus provides a method of signalling in a cellular communications system in which two signalling domains are supported. The first signalling domain supports signalling over the macro-scale cells which provide network coverage over the geographic region of the entire cellular communications system whereas the second signalling domain provides localised signalling for a plurality of small-scale cells supports signalling over a smaller geographic region located within the domain of coverage of one or more macro-scale cells.

In this way, a plurality of picocells and/or femtocells which individually provide coverage for network services within a small region of another overlay network are identified within that overlay network collectively as a small-scale communications network, regardless of whether such picocells and/or femtocells are supported by the same network operator/have their operation controlled by the same entity.

The plurality of small-scale cells is combined to form a local small-scale mobile communications network such that to the external (macro) mobile communications network they report as a single cell ID. This simplifies the neighbourhood list configuration in the macro network compared to having to create neighbourhood lists for each of the pico-cells/femtocells at a particular site.

According to an embodiment of the invention, for the purposes of reporting to the external macro network, one of the picocell/femtocell points of presence is nominated as the master or gateway to the macro network. For example, the presence of the cell cluster may be reported as cell ID X to the macro-scale network, however, each cell within the cell cluster has an individual identity cell ID X.0 within the local network 14a. All other pico/femtocells in the local network 14a have addresses in the range X.x and so an incoming call to the pico/femto cell is directed to the cell ID X externally within the macro network but is routed to the local cell ID X.x dependent on the presence information for the location of the mobile device within the local network 14a. The presence information for the location of the mobile device is registered by the device using its mobile identification information, for example, either an identifier associated with the subscriber, for example an IMSI (International Mobile Subscriber Identity) and/or an identifier associated with the mobile communications device, for example, an International Mobile Equipment Identity (IMEI), which is registered in association with the identity of the picocell that the device is located within and via which it connects to the macrocellular network. The registration process requires the mobile communications device to send information to a presence function resource provided either within the gateway node or alternatively to an associated server based presence function. Either form of localised presence function may utilise a local location registry 16.

Outgoing calls originating from within the small-scale network 14a are routed to the gateway node 20 and are passed to the macro network.

In one embodiment a small-scale communications network 14a comprises a site with a significant number of Low Power GSM (LPGSM) access points in a defined location, for example, a medium and/or large enterprise or residential/business sites with say 10 or more access points on the site.

The routing function uses by the invention can be implemented in one or more of the following locations: at the gateway node 20, a site-based central function (to which the gateway node communications) or to a distributed central function (for example, if the gate node performs a broadcast/polling lookup operation to query a number of other base-stations.

Figure 4A:
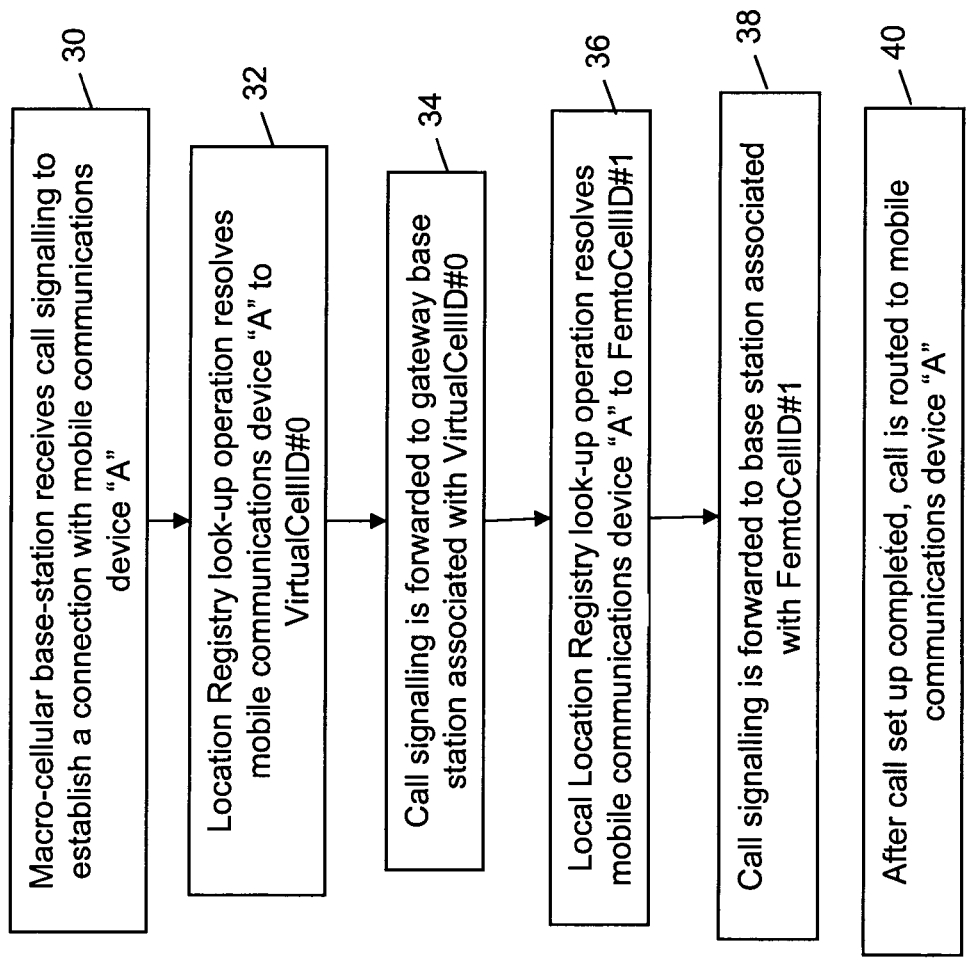
FIG. 4A shows schematically a method of routing a call from a macro communications network to a small-scale communications network according to an embodiment of the invention.

FIG. 4A of the accompanying drawings shows an embodiment of the invention comprising a method of signalling in a macro-cellular communications system in which at least one small-scale communications network is provided.

In FIG. 4A, when a macro-cellular base-station receives call to mobile communications device "A" (step 30) it performs a Location Registry look-up operation (step 32) (for example, using the IMEI and/or IMSI and/or other mobile telecommunications identifier for the called device such as the SIP identifier and/or mobile communications telephone number). In this exemplary embodiment, the look-up operation resolves the destination address for the communications call to mobile communications device "A" to VirtualCellID #0 and the call signalling is then forwarded to gateway base station 20 associated with VirtualCellID #0 (step 34). The receiving gateway base station 20 then consults the resource which is providing the local presence function, for example, base station 20 may perform a Local Location Registry look-up operation (step 36) which resolves the destination device identity (of mobile communications device "A") to the sub-address FemtoCellID #1. The call signalling is then forwarded to the base station associated with FemtoCellID #1 (step 38) and once the presence of the destination mobile device within femtocell 18a has been confirmed by the relevant destination base station, the call is routed through the macrocellular network to that base station (step 40). The call is routed via the gateway base-station 20 unless an alternative direct communications path exists from the source of the call to the destination base station.

Figure 4B:
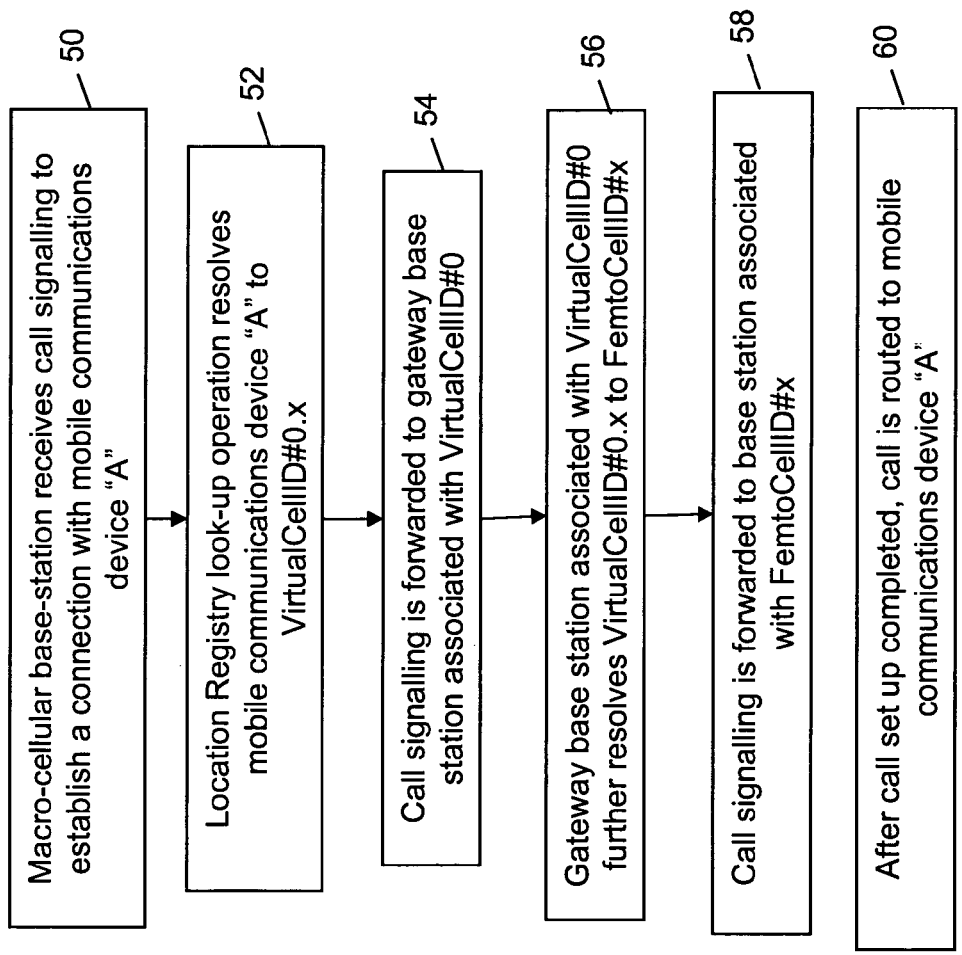
FIG. 4B shows schematically a method routing a call from a macro communications network to a small-scale communications network according to another embodiment of the invention.

FIG. 4B of the accompanying drawings shows another embodiment of the invention comprising a method of signalling in a macro-cellular communications system in which at least one small-scale communications network is provided.

In FIG. 4B, when a macro-cellular base-station receives call to mobile communications device "A" (step 50) it performs a Location Registry look-up operation (step 52) (for example, using the IMEI and/or IMSI and/or other mobile telecommunications identifier for the called device such as the SIP identifier and/or mobile communications telephone number). In this exemplary embodiment, the look-up operation resolves the destination address for the communications call to mobile communications device "A" to VirtualCellID #0.x, where the suffix ".x" refers to the cell identifier for the Femtocell within which the mobile communications device is located. This address VirtualCellID #0.x replaces the macro-cell identifier for the mobile communications device to ensure that the call signalling (and resultant call) is set up via the gateway base station 20 associated with the VirtualCellID #0 (step 44). This is achieved by the macro-cellular location register storing the full location address of the mobile communications device (i.e., the virtual cell identifier and the femtocell identifier) in a format which enables the routing operation in the macro-cellular network to ignore all location information relating to the Femtocell. This results in the call signalling being forwarding based only on the virtual cell identifier component (in one embodiment, the prefix of the full location) to the gateway base station associated with only the virtual cell identifier component of the full location address (step 54) and the call signalling is modified to carry with it an indication of either the full location identifier or the femtocell identifier. In either case, the receiving gateway base station 20 when receiving the call signalling, processes the call signalling to extract the femtocell identifier component (".x") to determine a FemtoCellID #x (step 56) in order to forward the call signalling accordingly to the correct cell (FemtoCellID #x). Once the call signalling has been forwarded to the base station associated with FemtoCellID #x and the presence of the destination mobile device within femtocell "x" has been confirmed, the call is routed through the macro cellular network to the mobile communications device in that femtocell (step 60). The call is routed via the gateway base-station 20 unless an alternative direct communications path exists from the source of the call to the base station of the destination femtocell.

Those of ordinary skill in the art will be aware of many modifications and functional equivalents to the features described herein in the above embodiments of the invention and the scope of the accompanying claims is intended to extend to include such alternatives and functional equivalents where such inclusion would be apparent to those of ordinary skill in the art.

Figure 5:
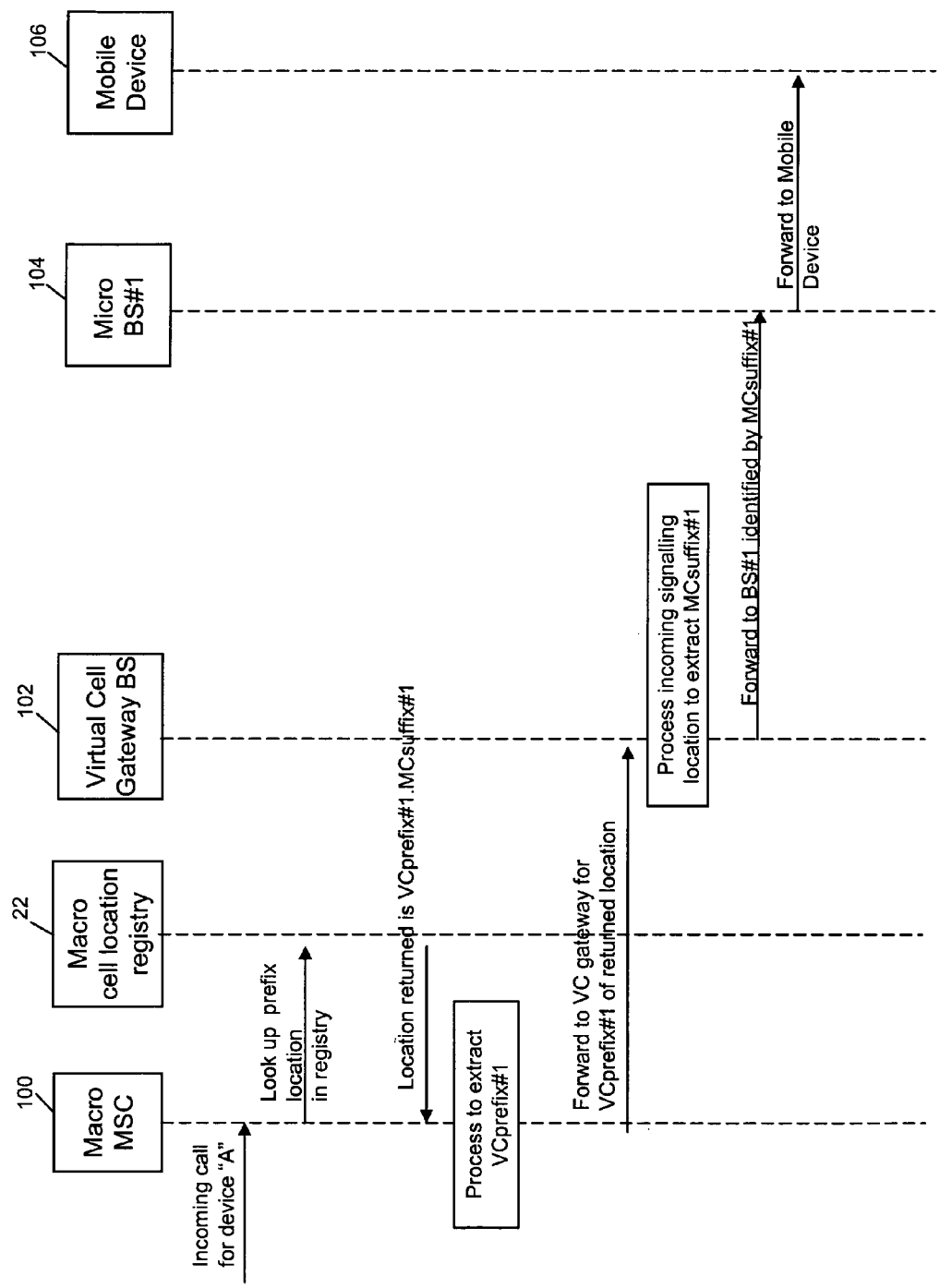
FIG. 5 is a sequence diagram showing how signalling for a mobile terminating call may be forwarded to a mobile device according to an embodiment of the invention.

FIG. 5 shows schematically how the various communications system components of communications network shown in Figure function and communicate information in order to terminate an incoming call which is to be received by a mobile device 106 located within one of a number of small cells of network coverage which have a stronger signal strength and/or other desirable network characteristics, shown as femto or microcells 16 in FIG. 1.

The incoming call signalling for a mobile device 106 is received by the appropriate mobile switching centre 100 for the macrocell network which then performs a location check in its macrocell location registry 22 as is known in the art. The macrocell location registry 22 returns a "special" address comprising a virtual cell identifier part and another part which identifies the small cell within which the mobile device being called has been indicated as located. The MSC 100 ignores the small cell location part of the address and forwards the call signalling using only the virtual cell identifier to a gateway base station 102 which is associated with that virtual cell identifier. The base station 102 processes the received signalling and extracts the small cell location address and forwards the signalling to the base station 104 associated with that address, which in turn forwards the signalling to mobile device 106, enabling a call to be established to the device.

Figure 6:
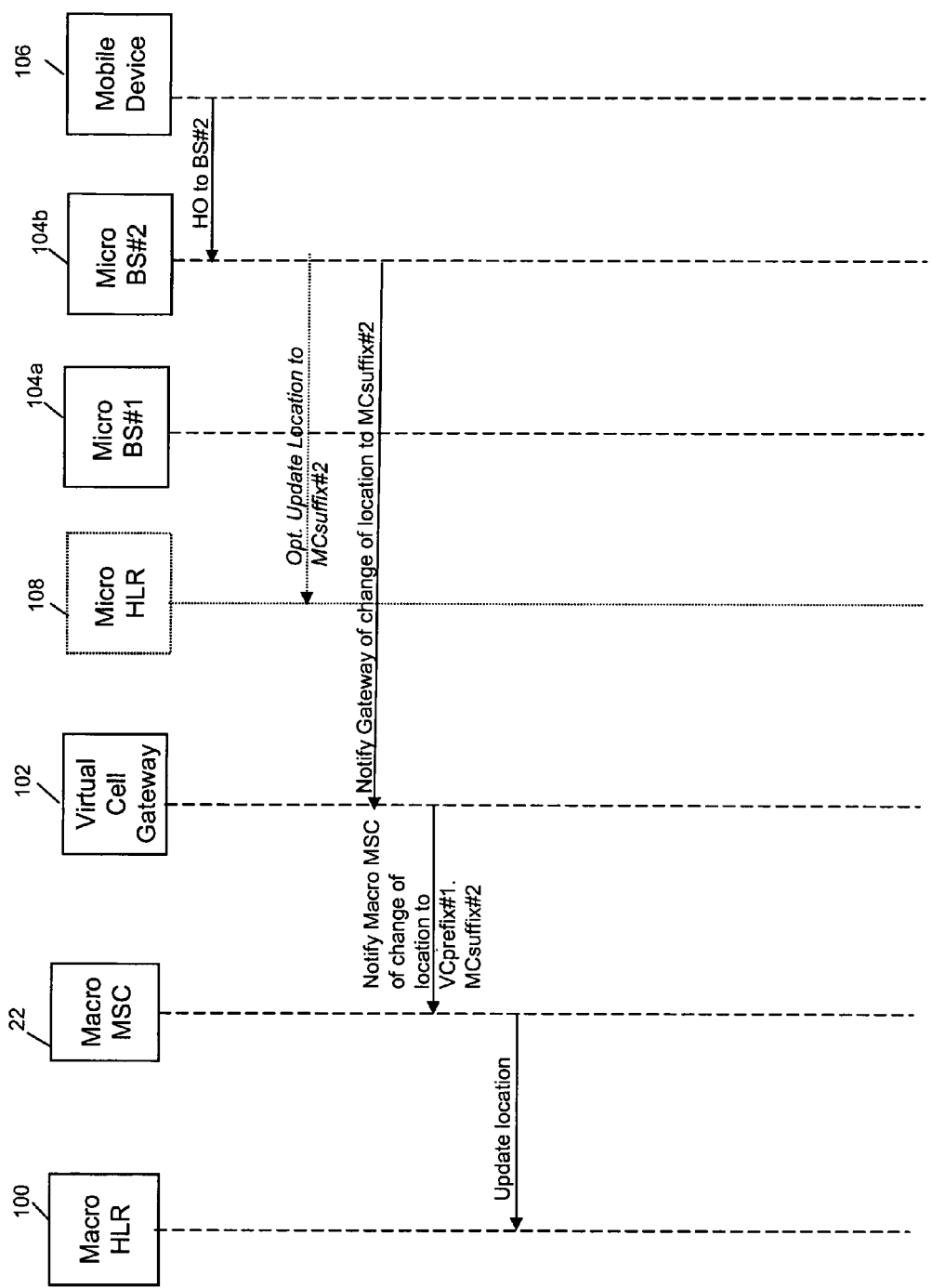
FIG. 6 shows how the location information is provided to the macrocellular network according to an embodiment of the invention.

FIG. 6 shows how a mobile device which performs a location change and successfully handovers (or roams) to another small cell within the domain of the gateway 102 results in the location update being forwarded via its new base station 104b (the loss of location may also be signalled by the old base station 104a in some embodiments) to the gateway node 102. Alternatively, or in addition, a location register 108 for the small cells 16 may be updated. The location register 108 can be updated either directly by the base stations 104a,b or by the gateway node 102 depending on how the system has been configured. The gateway node 102 then forwards the change of small cell location to the macrocell location registry 22 (which may be via the MSC 100 as shown in FIG. 5 for example, using any other apparent way depending on how the system is configured). The change of location reported by the gateway node 102 may be provided as a full address, i.e., as a virtual cell identifier prefix and a small cell identifier suffix, or in any other suitable way or format, or alternatively, just the small cell identifier suffix may be provided and the virtual cell identifier associated with that small cell and the gateway node added by the MSC 100 or location register 22.

Figure 7A:
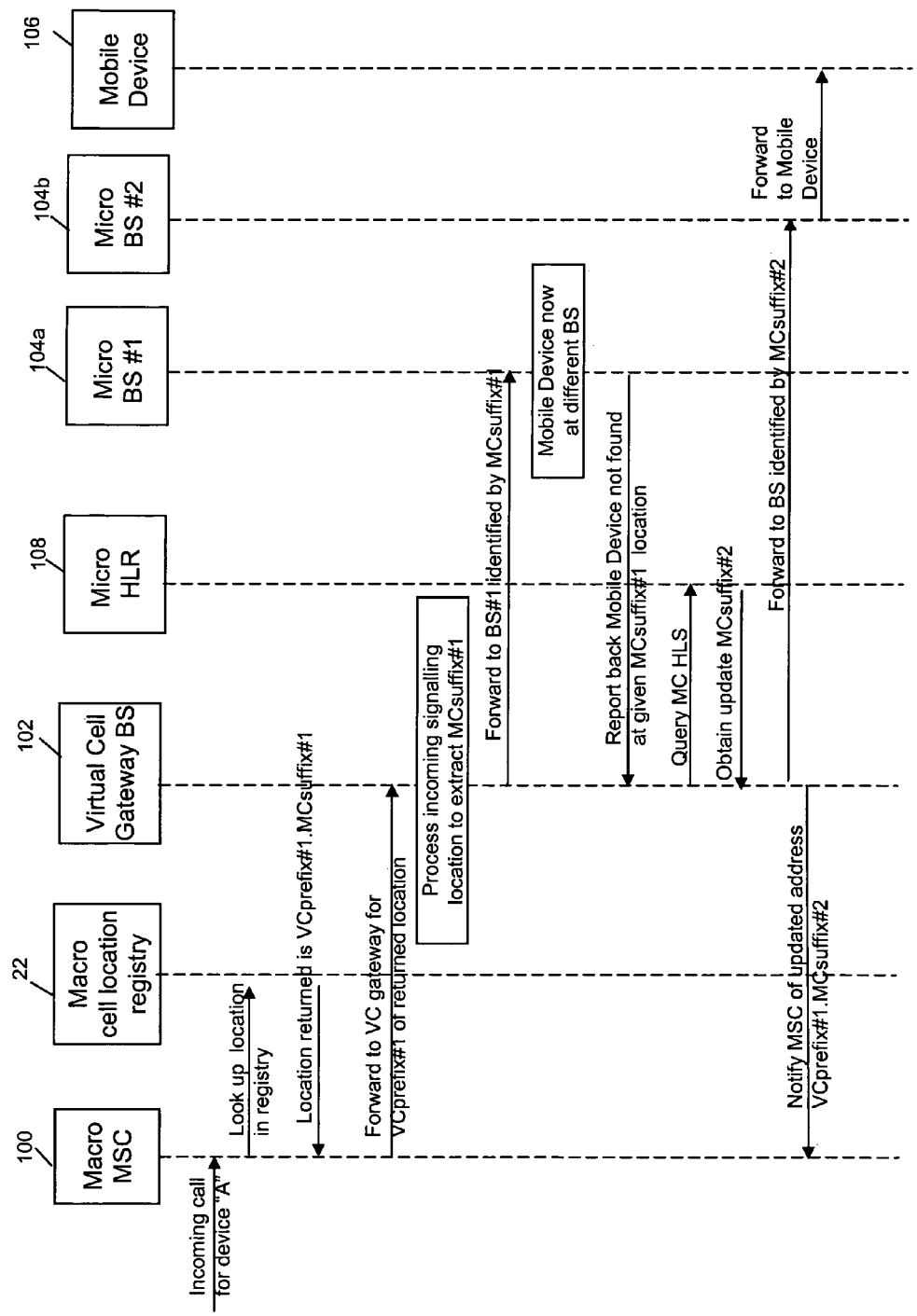
FIGS. 7a and 7b show how a mobile terminating call is forwarded to a mobile which changes its location to a cell which is not reported by the gateway base station tot he macrocell location register according to exemplary embodiments of the invention.

FIG. 7A shows that if for some reason a call is routed to a gateway node 102 for which the macrocell location register entry is out of date, the gateway node 102 can refer to the small cell location register to determined which micro-cell base station should be used to forward the signalling on to. Once the new small cell location address (as shown in FIG. 7A as base station #2) has been determined, the gateway node forwards the call signalling to the new base station #2 and updates the macro-cell location registry 22 with the change of address information so that subsequent calls can be more efficiently routed.

Figure 7B:
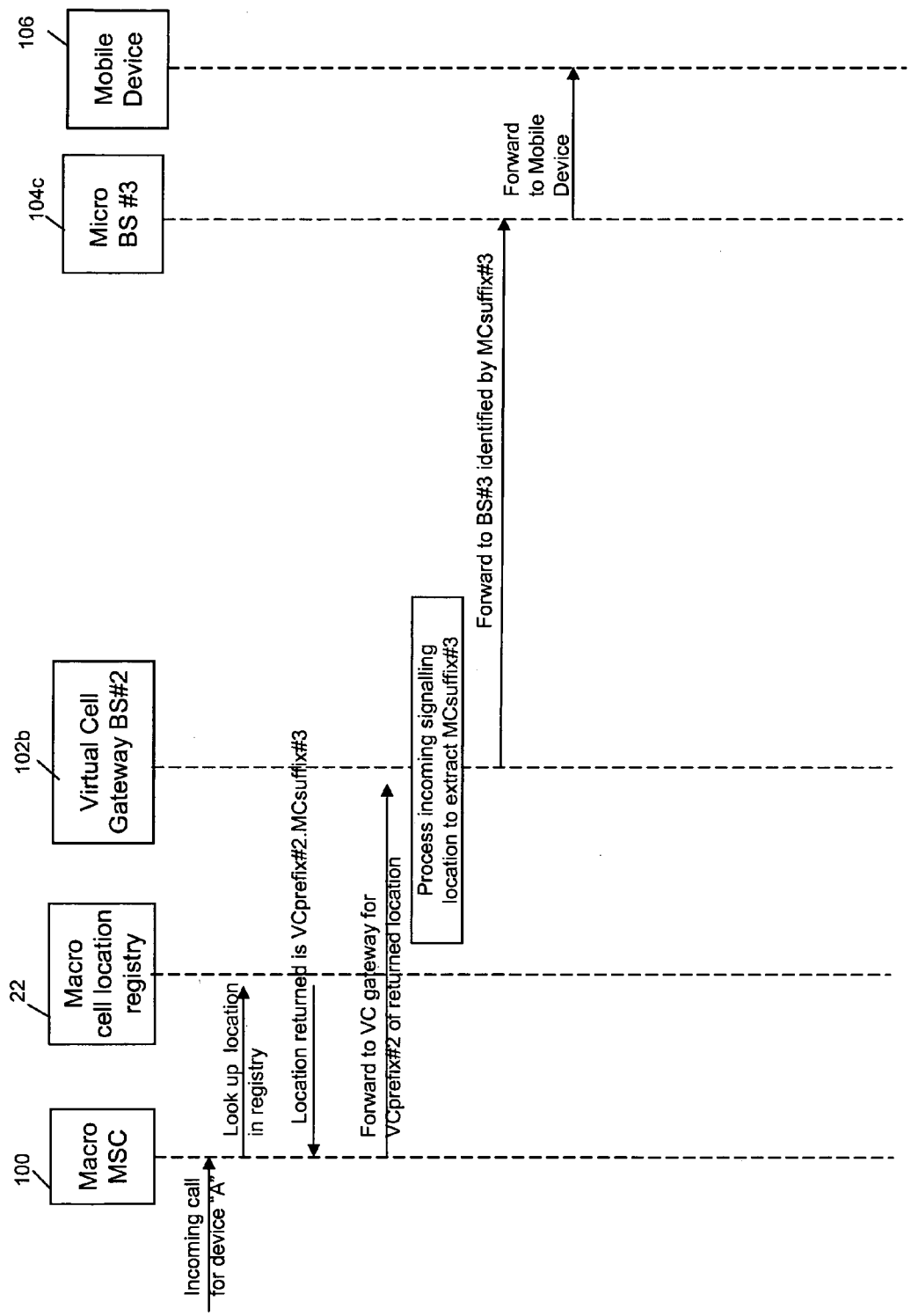

FIG. 7B shows how a gateway node 102 should not receive a call if the mobile device 106 has moved outside the area of its virtual cell. This usefully eliminates unnecessary signalling which might otherwise need to be polled. If the device is detected as having roamed to another small cell 16, a virtual cell gateway 102b with which that new cell is associated will report this change of location to the macrocell location registry 22, which will update the location to show the new virtual cell identifier (and include the new small cell identifier although this is not used within the macrocell network). Similarly, if the mobile moves to another macrocell which is not associated with a virtual cell, then the call will be placed in that macrocell.

In FIG. 7B, the look-up operation returns a different macrocell identity VCprefix #2 to the MSC, resulting in the signalling being forwarded to another virtual gateway node 102b, which then extracts a new small cell location identifier MC suffix #3, which enables the call to be forwarded to the appropriate base station 104c which forwards it to the mobile device 106.

The routing decision as to whether to forward a call (including call signalling) to a mobile device 106 can be based on any suitable known technique, as the location of the mobile device 106 can be more accurately known as either being within a particular virtual cell or not, and if within a particular virtual cell, the gateway node may extract the address of the appropriate small cell (e.g. a pico or microcell) base station directly from the received signalling.

In one embodiment, the area covered by the small cells associated with a virtual cell identifier has an equivalent scope to the equivalent macrocell area. This may facilitate an automatic update to the macrocell location registry being triggered when a device moves outside the area of a particular virtual cell identifier.

The invention thus enables a full address location change to be sent to and stored within the location register of a macrocell network which ignores the part of the address associated with a small cell whose area of network coverage overlaps with a particular macrocell but treats the part of the address which refers to a virtual cell identifier as equivalent to the location of a normal macrocell. It is only at the node associated with that virtual cell identifier which functions as a gateway to a plurality of cells associated with the virtual cell identifier that the other part of the full location address is used to forward a communication to the appropriate base station associated with the small cell.

The virtual cell may look like a normal Macro cell to the Macro network. The virtual cell has a known constant location and devices attached to the virtual cell are shown as being located on it. If a device leaves a virtual network then its location is updated by the Macro HLR in the same way as normal GSM, as it is detected as joining a new macro cell.

In one embodiment (which may be implemented in addition or instead of the above embodiments), when connected to the virtual cell the location within the virtual cell is only known locally by the combination of local register and cell gateway controller. As a device moves within the micro cells within the virtual cell then the local register is updated, but no changes are sent to the Macro cell HLR and the virtual cell ID is the anchor for macro cell location. The information on the location within the virtual cell is known locally for local call routing. This information is available within the local register and could under certain circumstances be made available to the Macro HLR and systems, i.e. for emergency call (detailed location). In one embodiment, therefore, the macrocell location registry 22 may only contain the virtual cell and the home small cell location of mobile device, with subsequent routing being performed within the routing domain of the small cell network by the gateway node using the local (small cell) register.

Thus in some embodiments of the invention, the current location of a mobile communications device is provided as a cell identifier in a local location registry, but a default may be provided in the macrocell which specifies a home location cell for that device which the gateway node extracts and uses as a default. The actual location of any local device within the virtual cell may be stored only within the local cell gateway location registry and any roaming within the virtual cell known only to the virtual cell gateway. The mobile switching centre (or equivalently, the appropriate macro cell controller) and HLR within the macrocell network is unaware that the device is attached to another physical micro cell in the virtual cell. When information of the physical attachment to a microcell within the virtual cell is required to be known by the macro network, then it is stored within the virtual cell gateway for routing calls within the virtual cell, and could be interrogated by the macro network.

The identifier for a small cell may be provided to the macrocell location register and/or to a local virtual cell register. The identifier may be provided in addition to the virtual cell identifier by said mobile communications device or the macrocell location register.

If the virtual cell identifier for a small cell is stored on said macrocell register instead of the identifier for a macrocell, the macrocell home location register (HLR) may store information on the location of the virtual cell location. The HLR will not normally resolve the location of the microcells within the virtual cell. The HLR may store this information in some embodiments of the invention but ignore it or alternatively it may not store this information even if it receives this information, or it may not even receive this information. In such embodiments, the small (micro) cell location information is stored in the local virtual cell register (i.e., the small cell location register) for local routing purposes. However, if the call had a particular priority, e.g. related to an emergency requiring a location to be determined, it is possible for the HLR to access this information either in its HLR if stored there, or by requesting it from the local (small cell) virtual cell LR.

Accordingly, in some embodiments, an incoming call/call signalling may be routed first by the macrocell network to a virtual cell, the virtual cell gateway then routes the call/signalling to the receiving device from information on its microcell location as stored in its local register. Any movement between local microcells within the virtual network is controlled and monitored by the local virtual cell gateway controller and register. The macrocell is unaware of device movement within the virtual cell.

The term "small cell" or "microcell" is used equivalently herein as a synedoche for cells having a smaller area than the cells referred to as "macrocells". A typical macrocell is a cell of the size, for example, used in the GSM cellular communications network. A virtual cell may comprise one or more "small" or "micro" cells, for example, cells known as femtocells or picocells.

Many modifications and variations to the above features of the invention will be apparent to one of ordinary skill in the art, and the description of the invention provided herein is not intended to be limited to only those embodiments which are explicitly set forth above. Where the inclusion of certain elements and functionality would be obvious to one of ordinary skill in the art, even if the description omits to describe such elements and/or functionality explicitly, they are to be considered implicitly included.

What is claimed is:

1. A cellular communications network comprising:
   a plurality of wireless network communications base stations of a first type;
   a plurality of wireless network communications base stations of a second type;
   a plurality of wireless communication cells of a first type which are provided by said base stations of said first type, each cell providing wireless communications cover over a predetermined geographic region to collectively form a macro-cellular communications network;
   a plurality of wireless communication cells of a second type which are provided by said base stations of said second type, wherein the plurality of said second type of cells collectively provides wireless communications cover within a region smaller than the predetermined geographic region of said first type of wireless communication cells;
   a gateway node providing an interface between a routing domain associated with cells of said first type and a routing domain associated with cells of said, second type;
   a routing node for routing communications and signalling in said macro-cellular communications network; and
   a first location register for registering a location of a plurality of mobile communications devices in one or more cells of said first type in said macro-cellular communications network;
   wherein the first location register records a location of at least one of said plurality of mobile communications devices as a virtual location if said mobile communication device reports its location to the routing node for said macro-cellular communications network as within one of a predetermined plurality of wireless communication cells of said second type,
   wherein in said first location register, a virtual cell identifier and an identifier for the cell of the second type is provided in addition to or instead of the identifier for the cell of the first type stored on said first location register.

2. The network as claimed in claim 1, wherein the first location register records the location of said mobile communications device as said virtual location instead of or in addition to recording the location of the device in a cell of said first type.

3. The network as claimed, in claim 1, wherein the virtual cell identifier for the cell of the second type is stored on said first location register instead of the identifier for the cell of the first type.

4. A method of routing call signalling to a destination address, said method routing the call signalling from a first cellular mobile communications network comprising a plurality of cells to one of a plurality of smaller cells collectively identified in said first mobile communications network by a single virtual cell identifier, the method comprising:
   receiving the call signalling for a call in a first routing domain associated with said first mobile communications network;
   determining in said first routing domain from said destination address a forwarding address for said call signalling, wherein said forwarding address comprises said virtual cell identifier and an identifier for one of said smaller cells, wherein said virtual cell identifier is different from said identifier for said one of said smarller cells;
   forwarding said call signalling to a network gateway node associated with said virtual cell identifier in said first routing domain, said gateway node being further arranged to participate in a different routing domain by extracting from the forwarded signalling, the identity of one of said smaller cells associated with said destination address; and
   routing the call signalling to said destination address, 5. The method as claimed in claim 4, Wherein said first routing domain is associated with a first location register for identifying a cell location of a called mobile communications device, wherein the location of said mobile communications device is identified as being in said virtual cell in said first cellular mobile communications network.

6. The method as claimed in claim 4, wherein said different routing domain is associated with another location register, wherein said mobile communications device is identified as being in one of said smaller cells in said other location register.

7. The method as claimed in claim 6, wherein
in said first location register the virtual cell identifier and the cell identifier of said smaller cell in which said mobile communications device is located are stored, and
in said first routing domain, only said virtual cell identifier is used for routing purposes, the method further comprising:
modifying said call signalling in said macro-cellular network to provide an indication of the identity of said smaller destination cell in which said mobile communications device is located to said gateway node, whereby said gateway node forwards said call signalling to the base station associated with the smaller destination cell.

8. The method as claimed in claim 4, wherein the gateway node comprises a wireless access point for one of said plurality of smaller cells collectively identified. by said virtual cell identifier.

9. A method of registering a mobile communications device in a communications system comprising a first, cellular communications network and at least one second cellular mobile communications network comprising a plurality of cells of smaller size than cells in said first cellular communications network, wherein said mobile communications device is configured to receive calls sent using the first communications network using a network infrastructure of the second communications network, the method comprising:
registering a virtual cell location of the mobile communications device in a first location register for said communications system, said virtual cell location collectively representing a cell identity of the plurality of cells which collectively form said second cellular network; and
registering a cell location for the location of the mobile device in said second cellular network in a second location register accessible within said second cellular network,
wherein both the virtual location Registered in the first location register and the cell location registered in the second location register are required to route calls originating external to said second cellular network to a destination in said second cellular network by firstly determining the virtual cell location of a called mobile communications device in the first location register and secondly determining a cell location of said called mobile communications device in said second cellular network in the second location register.

10. The gateway node of claim 1 configured, as a base station associated in the macro-cellular communications network, with said virtual cell identifier and arranged to resolve the signalling addressed to said virtual cell identifier to an identifier for a cell in said second communications network associated in said second location register with the cell location of the destination device for the incoming call.

11. A method of routing signalling for a call in a cellular communications network system, the system comprising:
a first wireless communications network having:
a mobile switching centre;
a plurality of macro-cell base stations, each said macro-cell base station being associated with a macrocell of network;
and at least one macrocell location register,
wherein the first wireless communications network shares at least some of its area of network coverage with at least one second wireless communications network, wherein said at least one second wireless communications network comprises a gateway node for a plurality of small cell base stations providing smaller cellular areas of network coverage than said macro-cells, each of said small cell base stations being arranged to report a change of small cell location address of a mobile device to said gateway node;
wherein,
said gateway node is configured to received and forward the received change of small cell location from a said cell base station to the macrocell ocation register together with a virtual cell identifier, the virtual cell identifier identifying the gateway node for a plurality of associated small cells;
the method comprising:
said mobile switching centre receiving said mobile terminating call fOr a mobile device;
said macrocell location register indicating to the mobile switching centre that the mobile is located in said virtual location cell;
forwarding the call signalling to the gateway node associated with said virtual location cell, said signalling including the small cell location of the mobile device;
the gateway node processing the received call signalling information to extract the small cell location; and
forwarding the call signalling to the base station associated with the indicated small cell location.

12. A cellular communications network system, the system comprising:
a first wireless communications network having:
a mobile switching centre;
a plurality of macro-cell base stations, each said macro-cell base station being associated with a macrocell of network coverage;
and at least one macrocell location register,
wherein the first wireless communications network shares at least part of its area of the network coverage with at least one second wireless communications network, wherein said at least one second wireless communications network comprises: a gateway node for a plurality of small cell base stations providing smaller cellular areas of network coverage than said macro-cells, each small cell base station being arranged to report a change of small cell location address of a mobile device to said gateway node;
wherein, said gateway node is configured to receive and foward the received change of small cell location from said small cell base station to the macrocell location register together with a virtual cell identifier, the virtual cell identifier identifying the gateway node as being the gateway for said plurality of associated small cells; and
said macrocellular location register stores a location address for a mobile device as comprising said virtual cell identifier and said small cell location identifier.

* * * * *